(12) United States Patent
Saeki

(10) Patent No.: US 11,726,512 B2
(45) Date of Patent: Aug. 15, 2023

(54) LOW POWER CONSUMPTION REGULATOR CIRCUITRY

(71) Applicant: Synaptics Incorporated, San Jose, CA (US)

(72) Inventor: Yutaka Saeki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 120 days.

(21) Appl. No.: 17/369,776

(22) Filed: Jul. 7, 2021

(65) Prior Publication Data

US 2023/0009465 A1    Jan. 12, 2023

(51) Int. Cl.
*G05F 1/56*          (2006.01)
*H02M 1/088*      (2006.01)

(52) U.S. Cl.
CPC .............. *G05F 1/56* (2013.01); *H02M 1/088* (2013.01)

(58) Field of Classification Search
CPC .... G05F 1/56; H02M 1/088; H03K 17/04106; H03K 17/04123; H03K 17/04163
See application file for complete search history.

(56) References Cited

U.S. PATENT DOCUMENTS

| | | | | |
|---|---|---|---|---|
| 7,034,615 B2 * | 4/2006 | Moon | ................... | H03F 3/3023 330/252 |
| 9,431,968 B2 * | 8/2016 | Montazer | ............... | H03F 1/0261 |
| 10,234,881 B1 * | 3/2019 | Goyal | ..................... | G05F 1/565 |
| 11,251,761 B1 * | 2/2022 | Saeki | ................... | H03F 3/45475 |
| 11,456,715 B1 * | 9/2022 | Saeki | .................... | G09G 3/3696 |
| 2004/0145413 A1 * | 7/2004 | Moon | ................... | H03F 3/3023 330/255 |
| 2008/0054872 A1 * | 3/2008 | Kobayashi | ................ | H02J 1/06 323/351 |
| 2014/0375384 A1 * | 12/2014 | Bohannon | ........... | H03F 3/45183 330/251 |
| 2015/0084694 A1 * | 3/2015 | Lee | .......................... | H03F 1/483 327/170 |
| 2015/0310822 A1 * | 10/2015 | Saeki | ................... | G09G 3/3688 330/253 |
| 2016/0054748 A1 * | 2/2016 | Kronmueller | ........... | G05F 1/468 323/266 |
| 2016/0179115 A1 * | 6/2016 | Kronmueller | ............. | H03F 3/21 323/280 |
| 2017/0140725 A1 * | 5/2017 | Saeki | ................... | G09G 3/3688 |
| 2017/0353188 A1 * | 12/2017 | Saeki | ...................... | H03F 3/301 |
| 2021/0288649 A1 * | 9/2021 | Ye | .................. | H03K 19/018528 |
| 2021/0303017 A1 * | 9/2021 | Saeki | .................... | H03F 3/3016 |
| 2023/0009465 A1 * | 1/2023 | Saeki | ........................ | G05F 1/56 |

* cited by examiner

*Primary Examiner* — Sisay G Tiku
(74) *Attorney, Agent, or Firm* — Ferguson Braswell Fraser Kubasta PC

(57) ABSTRACT

Regulator circuitry includes first to third output transistors, a first control transistor and a circuit stage. The first and second output transistors, and the first control transistor have a first channel conductivity type. The second output transistor has a second channel conductivity type. The first and second output transistors have a drain coupled to an output node and a source coupled to a first power supply line. The third output transistor has a drain coupled to the output node and a source coupled to a second power supply line. The circuit stage is configured to drive the gates of the first output transistor, the third output transistor, and the first control transistor based on a specified level of the output voltage.

19 Claims, 10 Drawing Sheets

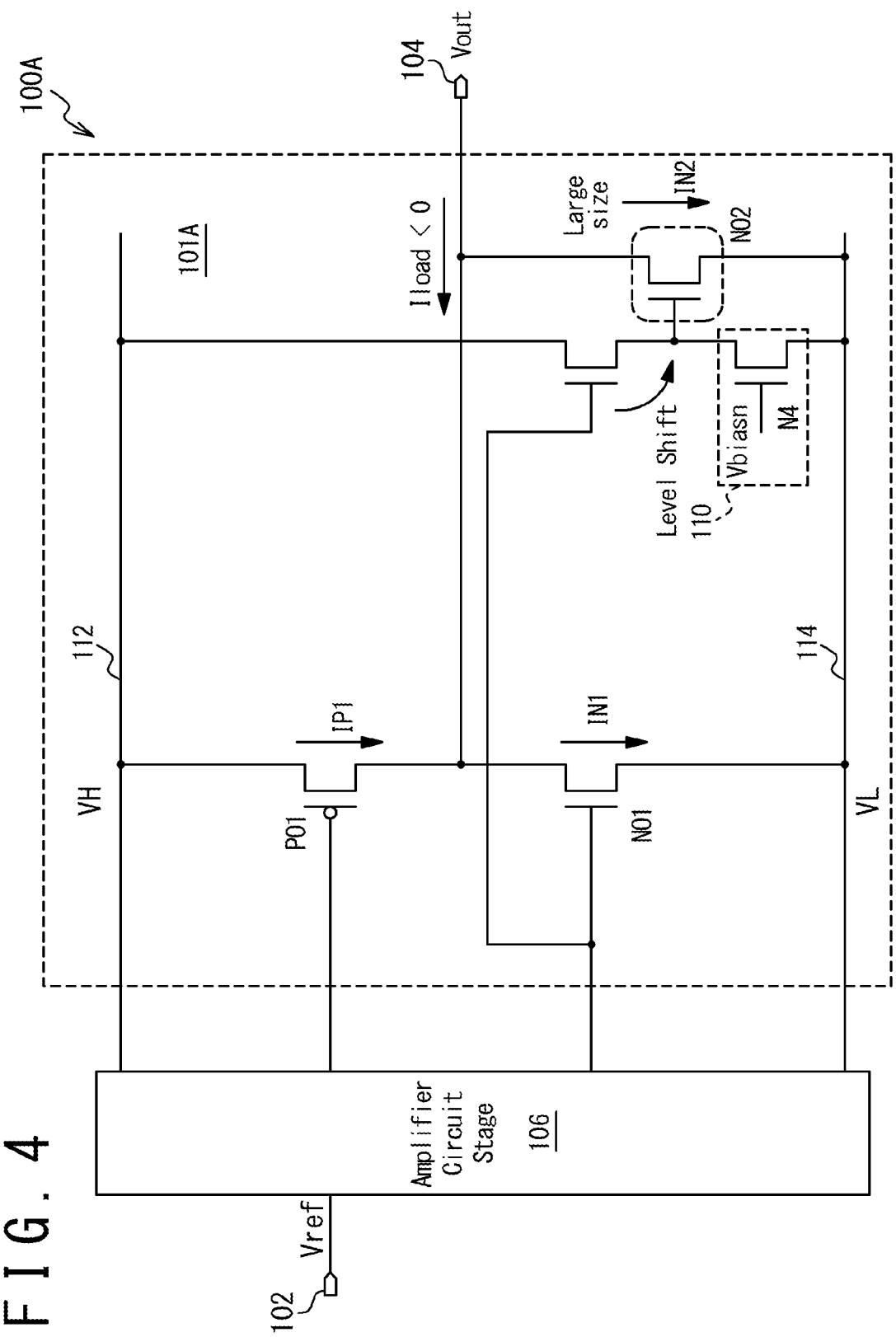

F I G. 7
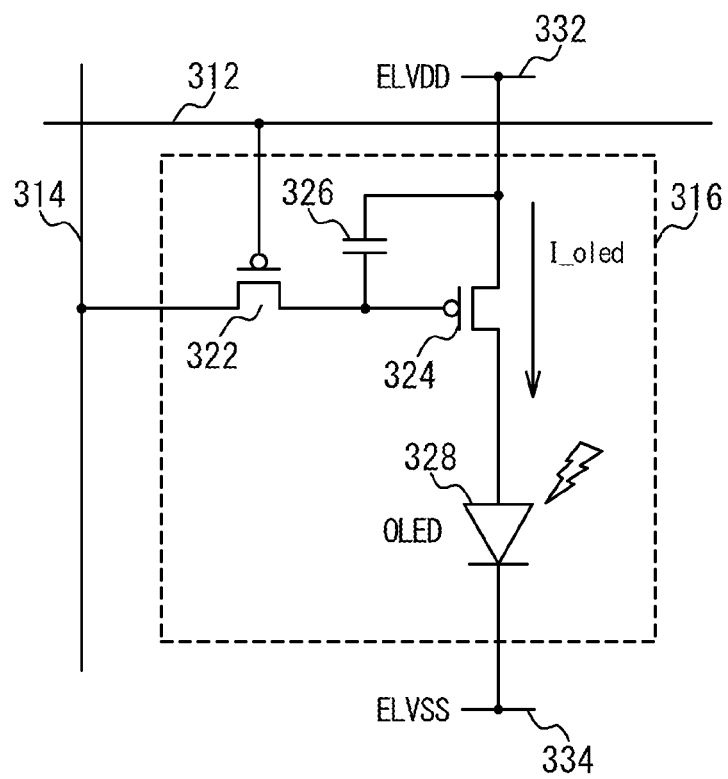

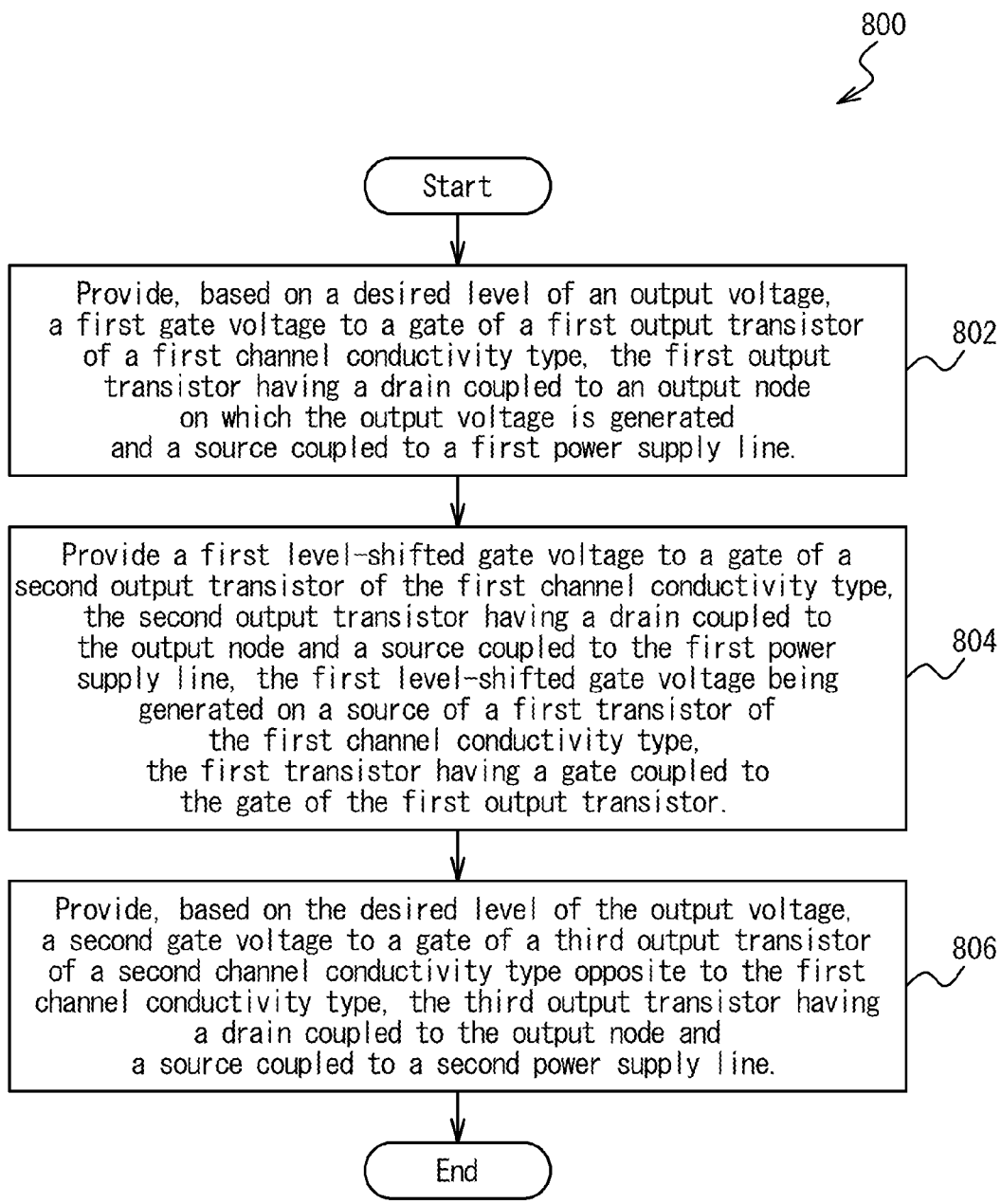

LOW POWER CONSUMPTION REGULATOR CIRCUITRY

FIELD

The disclosed technology generally relates to regulator circuitry.

BACKGROUND

Voltage regulators such as linear regulators and low-dropout (LDO) regulators are widely used to generate constant voltages in integrated circuits (ICs). A voltage regulator may consume considerable power especially when driving a large capacitive load, and there is therefore a technical need for providing low power consumption regulators.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, regulator circuitry is provided. The regulator circuitry includes a first output transistor of a first channel conductivity type, a second output transistor of the first channel conductivity type, a third output transistor of a second channel conductivity type opposite to the first channel conductivity type, a first control transistor of the first channel conductivity type, and a circuit stage. The first output transistor has a drain coupled to an output node on which an output voltage is generated and a source coupled to a first power supply line. The second output transistor has a drain coupled to the output node and a source coupled to the first power supply line. The third output transistor has a drain coupled to the output node and a source coupled to a second power supply line. The first control transistor has a gate coupled to a gate of the first output transistor and a source coupled to a gate of the second output transistor. The circuit stage is configured to drive the gates of the first output transistor, the third output transistor, and the first control transistor based on a specified level of the output voltage.

In other embodiments, regulator circuitry includes a first output transistor of a first channel conductivity type, a second output transistor of the first channel conductivity type, a third output transistor of a second channel conductivity type opposite to the first channel conductivity type, a circuit stage, and first level shifting circuitry. The first output transistor has a drain coupled to an output node on which an output voltage is generated and a source coupled to a first power supply line. The second output transistor has a drain coupled to the output node and a source coupled to the first power supply line. The third output transistor has a drain coupled to the output node and a source coupled to a second power supply line. The circuit stage is configured to provide a first gate voltage to a gate of the first output transistor based on a specified level of the output voltage; and provide a second gate voltage to a gate of the third output transistor based on the specified level of the output voltage. The first level shifting circuitry is configured to provide a first level-shifted gate voltage to a gate of the second output transistor, the first level-shifted gate voltage being generated through level shifting of the first gate voltage.

In one or more embodiments, a method for operating regulator circuitry is provided. The method includes supplying, based on a specified level of an output voltage, a first gate voltage to a gate of a first output transistor of a first channel conductivity type. The first output transistor has a drain coupled to an output node on which the output voltage is generated and a source coupled to a first power supply line. The method further includes supplying a first level-shifted gate voltage to a gate of a second output transistor of the first channel conductivity type. The second output transistor has a drain coupled to the output node and a source coupled to the first power supply line. The first level-shifted gate voltage is generated on a source of a first control transistor of the first channel conductivity type. The first control transistor has a gate coupled to the gate of the first output transistor. The method further includes supplying, based on the specified level of the output voltage, a second gate voltage to a gate of a third output transistor of a second channel conductivity type opposite to the first channel conductivity type. The third output transistor has a drain coupled to the output node and a source coupled to a second power supply line.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 4 illustrates an example configuration of regulator circuitry, according to other embodiments.

FIG. 7 illustrates an example configuration of a pixel, according to one or more embodiments.

FIG. 8 illustrates an example method of operating regulator circuitry, according to one or more embodiments.

Figure 1:
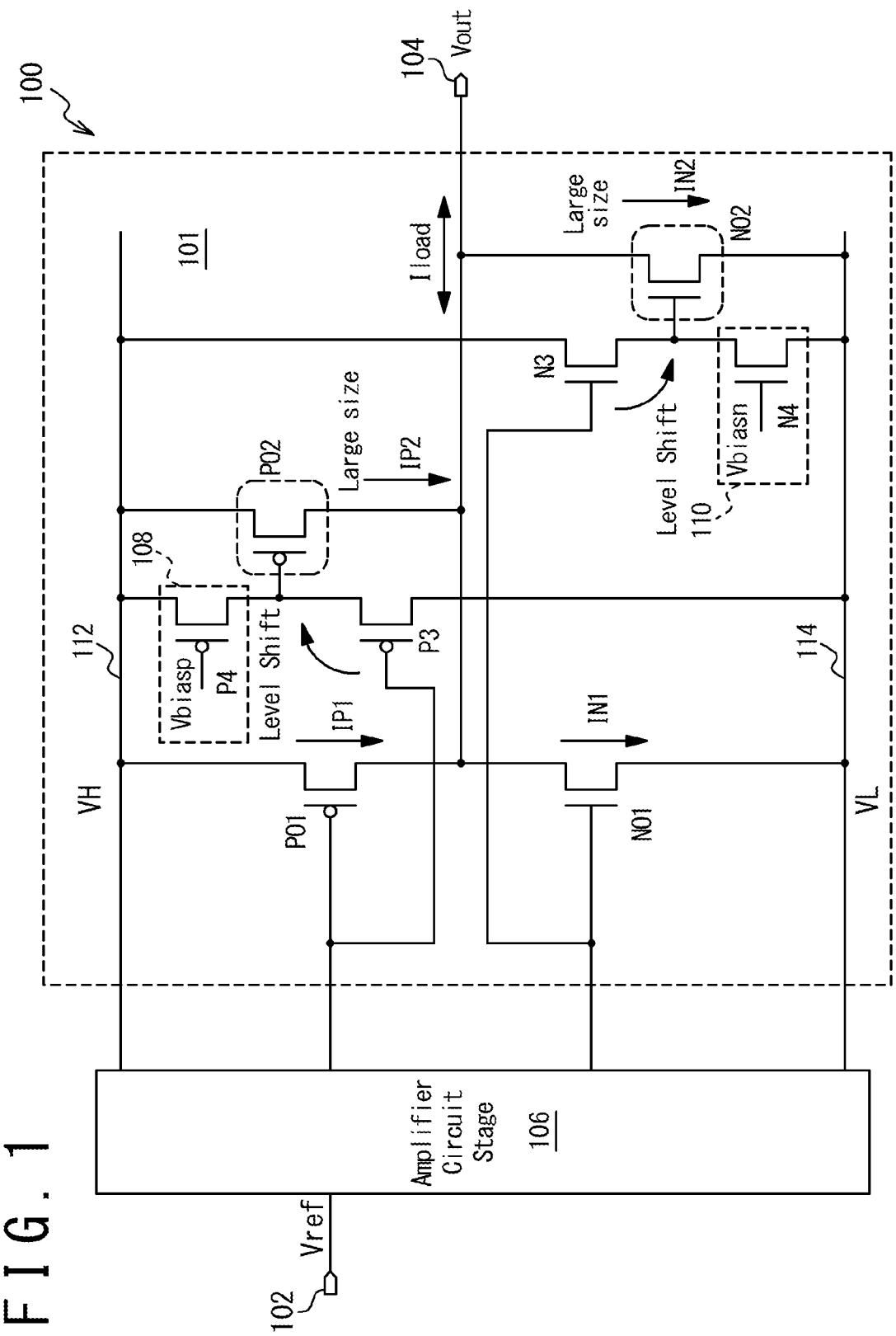
FIG. 1 illustrates an example configuration of regulator circuitry, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In the application, the term "coupled" as used means connected directly to or connected through one or more intervening components or circuits.

Voltage regulators are widely used to generate constant voltages (e.g., power supply voltages) in ICs. One issue with voltage regulators may be power consumption. A voltage regulator coupled to a large load capacitance may incorporate an output transistor with an increased gate width (or an increased transistor size). Such a voltage regulator may however suffer from increased power consumption due to an increased self-consumption current through the output transistor. The present disclosure provides technologies to reduce current consumption of regulator circuitry.

In one or more embodiments, regulator circuitry includes a first output transistor of a first channel conductivity type, a second output transistor of the first channel conductivity type, a third output transistor of a second channel conductivity type opposite to the first channel conductivity type, a first control transistor of the first channel conductivity type, and a circuit stage. The first output transistor has a drain coupled to an output node on which an output voltage is generated and a source coupled to a first power supply line. The second output transistor has a drain coupled to the output node and a source coupled to the first power supply line. The third output transistor has a drain coupled to the output node and a source coupled to a second power supply line. The first control transistor has a gate coupled to a gate of the first output transistor and a source coupled to a gate of the second output transistor. The circuit stage is configured to drive the gates of the first output transistor, the third output transistor, and the first control transistor based on a specified level of the output voltage. This circuit configuration may reduce the gate widths of the first and third output transistors, which are primarily used to maintain the output voltage at the specified level, because the second output transistor is configured to drive the output voltage when the output voltage deviates from the specified level. The reduction in the gate widths of the first and third output transistors may effectively suppress the self-consumption current of the regulator circuitry (e.g., the current through the first and third output transistors), contributing to current consumption reduction.

FIG. 1 illustrates an example configuration of regulator circuitry 100, which is configured to generate a constant output voltage Vout on an output node 104 based on a reference voltage Vref supplied to an input node 102, according to one or more embodiments. The reference voltage Vref may indicate a specified level of the output voltage Vout. In one implementation, the regulator circuitry 100 may be configured to regulate the output voltage Vout to have the same voltage level as the reference voltage Vref.

In the illustrated embodiment, the regulator circuitry 100 includes an output stage 101 and an amplifier circuit stage 106. The output stage 101 includes positive-channel metal oxide semiconductor (PMOS) output transistors PO1, PO2, a PMOS control transistor P3, negative-channel metal oxide semiconductor (NMOS) output transistors NO1, NO2, an NMOS control transistor N3, and constant current sources 108 and 110. The PMOS output transistors PO1, PO2, and the PMOS control transistor P3 have a positive channel conductivity type (i.e., p-type), and the NMOS output transistors NO1, NO2, and the NMOS control transistor N3 have a negative channel conductivity type (i.e., n-type). In FIG. 1, the currents through the PMOS output transistors PO1 and PO2 are indicated by "IP1" and "IP2", and the currents through the NMOS output transistors NO1 and NO2 are indicated by "IN1" and "IN2." Further, "Iload" indicates the load current supplied to or sunk from a load coupled to the output node 104. The polarity of the load current Iload is defined as positive (e.g., Iload>0) when the load current Iload is supplied (or goes out) to the load coupled to the output node 104 and negative (e.g., Iload<0) when the load current Iload is sunk (or comes in) from the load.

The PMOS output transistor PO1 has a source coupled to a high-side power supply line 112 on which a high-side power source voltage VH is generated, a gate coupled to the amplifier circuit stage 106, and a drain coupled to the output node 104. The PMOS control transistor P3 has a source coupled to the constant current source 108, a gate coupled to the gate of the output transistor PO1, and a drain coupled to a low-side power supply line 114 on which a low-side power source voltage VL lower than the high-side power source voltage VH is generated. The low-side power source voltage VL may be a circuit ground voltage. The PMOS output transistor PO2 has a source coupled to the high-side power supply line 112, a gate coupled to the source of the PMOS control transistor P3, and a drain coupled to the output node 104. In various implementations, the PMOS output transistor PO2 has a larger gate width (or a larger size) than the gate width of the PMOS output transistor PO1, which allows the PMOS output transistor PO2 to drive a larger current than the PMOS output transistor PO1 for the same gate-source voltage.

The constant current source 108 is coupled between the high-side power supply line 112 and the source of the PMOS control transistor P3 to generate a constant current through the PMOS control transistor P3. The constant current source 108 and the PMOS control transistor P3 collectively operate as first level shifting circuitry configured to generate and supply a first level-shifted gate voltage to the PMOS output transistor PO2. The first level shifting circuitry is configured generate the first level-shifted gate voltage through level shifting of the gate voltage of the PMOS output transistor PO1. In one implementation, the gate voltage of the PMOS output transistor PO2 is higher than the gate voltage of the PMOS output transistor PO1, where the difference between the gate voltage of the PMOS output transistor PO2 and the gate voltage of the PMOS output transistor PO1 is equal to the absolute value of the threshold voltage of the PMOS output transistor PO1. By the gate voltage of the PMOS transistor PO2 being higher than the gate voltage of the PMOS output transistor PO1, the gate-source voltage of the PMOS output transistor PO2 is lower than the gate-source voltage of the PMOS output transistor PO1. In the illustrated embodiment, the constant current source 108 includes a PMOS transistor P4 that has a source coupled to the high-side power supply line 112, a gate biased with a fixed bias voltage Vbiasp, and a drain coupled to the source of the PMOS control transistor P3.

The NMOS output transistor NO1 has a source coupled to the low-side power supply line 114, a gate coupled to the amplifier circuit stage 106, and a drain coupled to the output node 104. The NMOS control transistor N3 has a source coupled to the constant current source 110, a gate coupled to the gate of the output transistor NO1, and a drain coupled to the high-side power supply line 112. The NMOS output transistor NO2 has a source coupled to the high-side power supply line 112, a gate coupled to the source of the NMOS control transistor N3, and a drain coupled to the output node 104. In various implementations, the NMOS output transistor NO2 has a larger gate width (or a larger size) than the gate width of the NMOS output transistor NO1. The larger gate width allows the NMOS output transistor NO2 to drive a larger current than the NMOS output transistor NO1 for the same gate-source voltage.

The constant current source 110 is coupled between the low-side power supply line 114 and the source of the NMOS control transistor N3 to generate a constant current through the NMOS control transistor N3. The constant current source 110 and the NMOS control transistor N3 collectively operate as second level shifting circuitry configured to generate and supply a second level-shifted gate voltage to the NMOS output transistor NO2. The second level shifting circuitry is configured to generate the second level-shifted gate voltage through level shifting of the gate voltage of the NMOS output transistor NO1. In one implementation, the gate voltage of the NMOS output transistor NO2 is lower than the gate voltage of the NMOS output transistor NO1, where the difference between the gate voltages of the NMOS transistors NO1 and NO2 is equal to the threshold voltage of the NMOS output transistor NO1. By the gate voltage of the NMOS output transistor NO2 being lower than the gate voltage of the NMOS output transistor NO1, the gate-source voltage of the NMOS output transistor NO2 is lower than the gate-source voltage of the NMOS output transistor NO1. In the illustrated embodiment, the constant current source 110 includes an NMOS transistor N4 that has a source coupled to the low-side power supply line 114, a gate biased with a fixed bias voltage Vbiasn, and a drain coupled to the source of the NMOS control transistor N3.

The amplifier circuit stage 106 is configured to drive the gates of the PMOS output transistor PO1, the PMOS control transistor P3, the NMOS output transistor NO1, and the NMOS control transistor N3 based on a specified level of the output voltage Vout. In the illustrated embodiment, the reference voltage Vref is provided to the input node 102 to specify the level of the output voltage Vout. In one implementation, the reference voltage Vref has the specified level and the amplifier circuit stage 106 is configured to drive the gates of the PMOS output transistor PO1, the PMOS control transistor P3, the NMOS output transistor NO1, and the NMOS control transistor N3 such that the output voltage Vout is equal to the reference voltage Vref. It is noted that the PMOS output transistor PO1 and the PMOS control transistor P3 are configured to receive the same gate voltage from the amplifier circuit stage 106, and the NMOS output transistor NO1 and the NMOS control transistor N3 are configured to receive the same gate voltage from the amplifier circuit stage 106.

Figure 2:
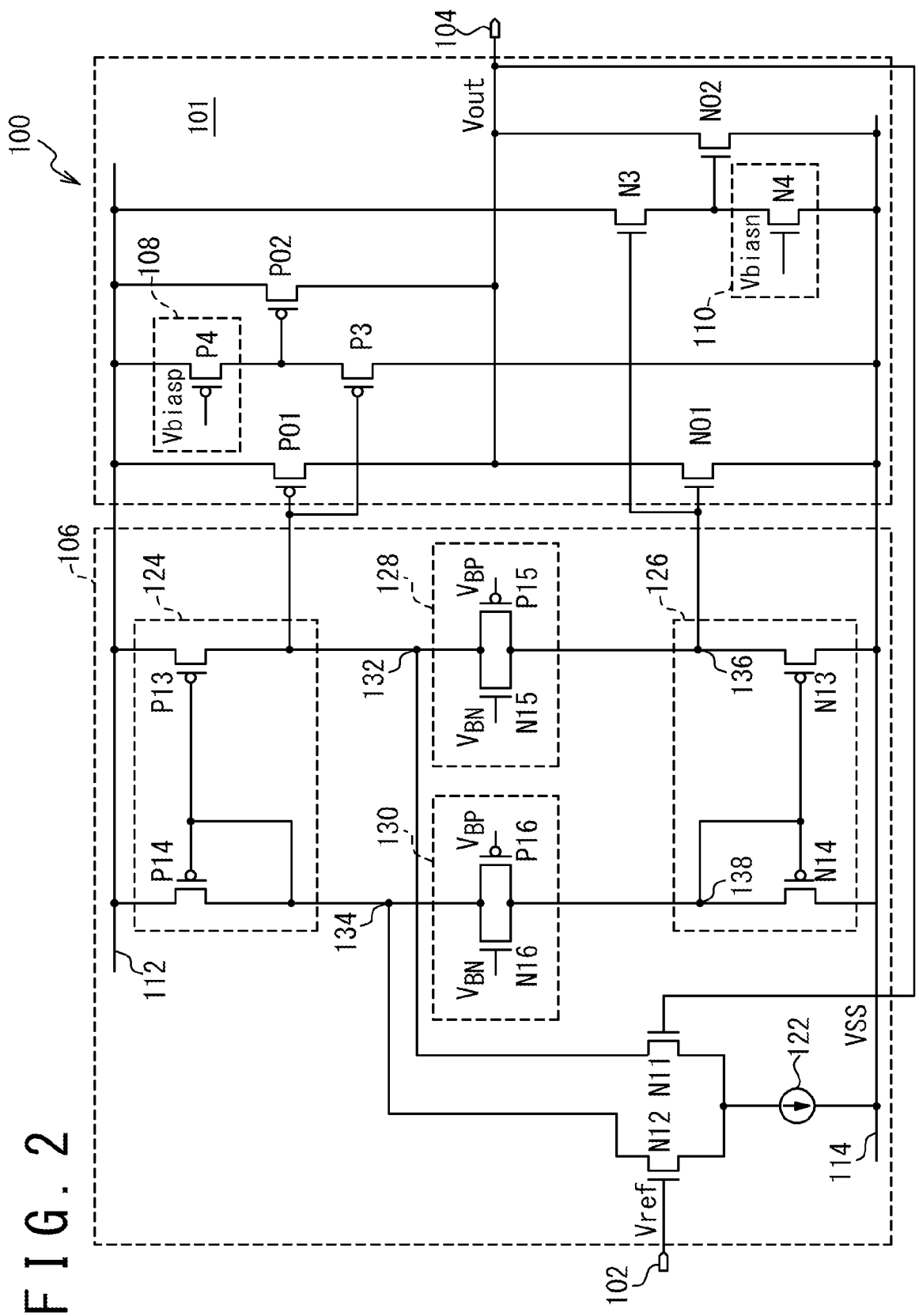
FIG. 2 illustrates an example configuration of an amplifier circuit stage of regulator circuitry, according to one or more embodiments.

FIG. 2 illustrate an example configuration of the amplifier circuit stage 106, according to one or more embodiments. In the illustrated embodiment, the amplifier circuit stage 106 includes a pair of NMOS transistors N11, N12, a constant current source 122, current mirrors 124, 126, and floating current sources 128 and 130.

The NMOS transistors N11, N12, and the constant current source 122 are configured to collectively operate as a differential input stage configured to generate a pair of currents corresponding to the difference between the output voltage Vout and the reference voltage Vref. The NMOS transistor N11 has a gate coupled to the output node 104 to receive the output voltage Vout and the NMOS transistor N12 has a gate coupled to the input node 102 to receive the reference voltage Vref. The sources of the NMOS transistors N11 and N12 are commonly coupled to the constant current source 122, which is configured to draw a constant current from the commonly-coupled sources of the NMOS transistors N11 and N12. As a result, the current through the NMOS transistor N11 corresponds to the output voltage Vout and the current through the NMOS transistor N12 corresponds to the reference voltage Vref.

The current mirrors 124, 126, the floating current sources 128 and 130 are collectively configured as an active load configured to generate the gate voltage of the PMOS output transistor PO1 (which is also provided to the gate of the PMOS control transistor P3) and the gate voltage of the NMOS output transistor NO1 (which is also provided to the gate of the NMOS control transistor N3).

The current mirror 124 includes PMOS transistors P13 and P14 that have commonly-coupled gates coupled to the drain of the PMOS transistor P14. The sources of the PMOS transistors P13 and P14 are commonly coupled to the high-side power supply line 112. The drain of the PMOS transistor P13 is coupled to a node 132 that is coupled to the drain of the NMOS transistor N11, and the drain of the PMOS transistor P14 is coupled to a node 134 that is coupled to the drain of the NMOS transistors N12.

The current mirror 126 includes NMOS transistors N13 and N14 that have commonly-coupled to the drain of the NMOS transistor N14. The sources of the NMOS transistors N13 and N14 are commonly coupled to the low-side power supply line 114. The drain of the NMOS transistor N13 is coupled to a node 136, and the drain of the NMOS transistor N14 is coupled to a node 138.

The floating current source 128 is configured to draw a first constant current from the node 132 and supply the first constant current to the node 136. In one implementation, the floating current source 128 includes an NMOS transistor N15 and a PMOS transistor P15. The NMOS transistor N15 has a drain coupled to the node 132, a source coupled to the node 136, and a gate biased with a fixed bias voltage $V_{BN}$. The PMOS transistor P15 has a source coupled to the node 132, a drain coupled to the node 136, and a gate biased with a fixed bias voltage $V_{BP}$.

The floating current source 130 is configured to draw a second constant current from the node 134 and supply the second constant current to the node 138. In one implementation, the floating current source 130 includes an NMOS transistor N16 and a PMOS transistor P16. The NMOS transistor N16 has a drain coupled to the node 134, a source coupled to the node 138, and a gate biased with the fixed bias voltage $V_{BN}$. The PMOS transistor P16 has a source coupled to the node 134, a drain coupled to the node 138, and a gate biased with the fixed bias voltage $V_{BP}$.

The node 132 of the amplifier circuit stage 106 is coupled to the gates of the PMOS output transistor PO1 and the PMOS control transistor P3, and the node 136 is coupled to the gates of the NMOS output transistor NO1 and the NMOS control transistor N3. The amplifier circuit stage 106 is configured to supply the gate voltages of the PMOS output transistor PO1 and the PMOS control transistor P3 on the node 132 and the gate voltages of the NMOS output transistor NO1 and the NMOS control transistor N3 on the node 136 such that the output voltage Vout is equal to the reference voltage Vref.

In other embodiments, the configuration of the amplifier circuit stage 106 may be variously modified. In some embodiments, a pair of PMOS transistors having commonly-coupled sources coupled to a constant current source may be used in place of or in addition to the NMOS transistors N11 and N12. In such embodiments, the gates of the PMOS transistors may be coupled to the output node 104 and the input node 102, respectively, and the drains of the PMOS transistors may be coupled to the node 136 and the node 138, respectively. In other embodiments, a differently-configured active load may be used in the amplifier circuit stage 106.

Figure 3A:
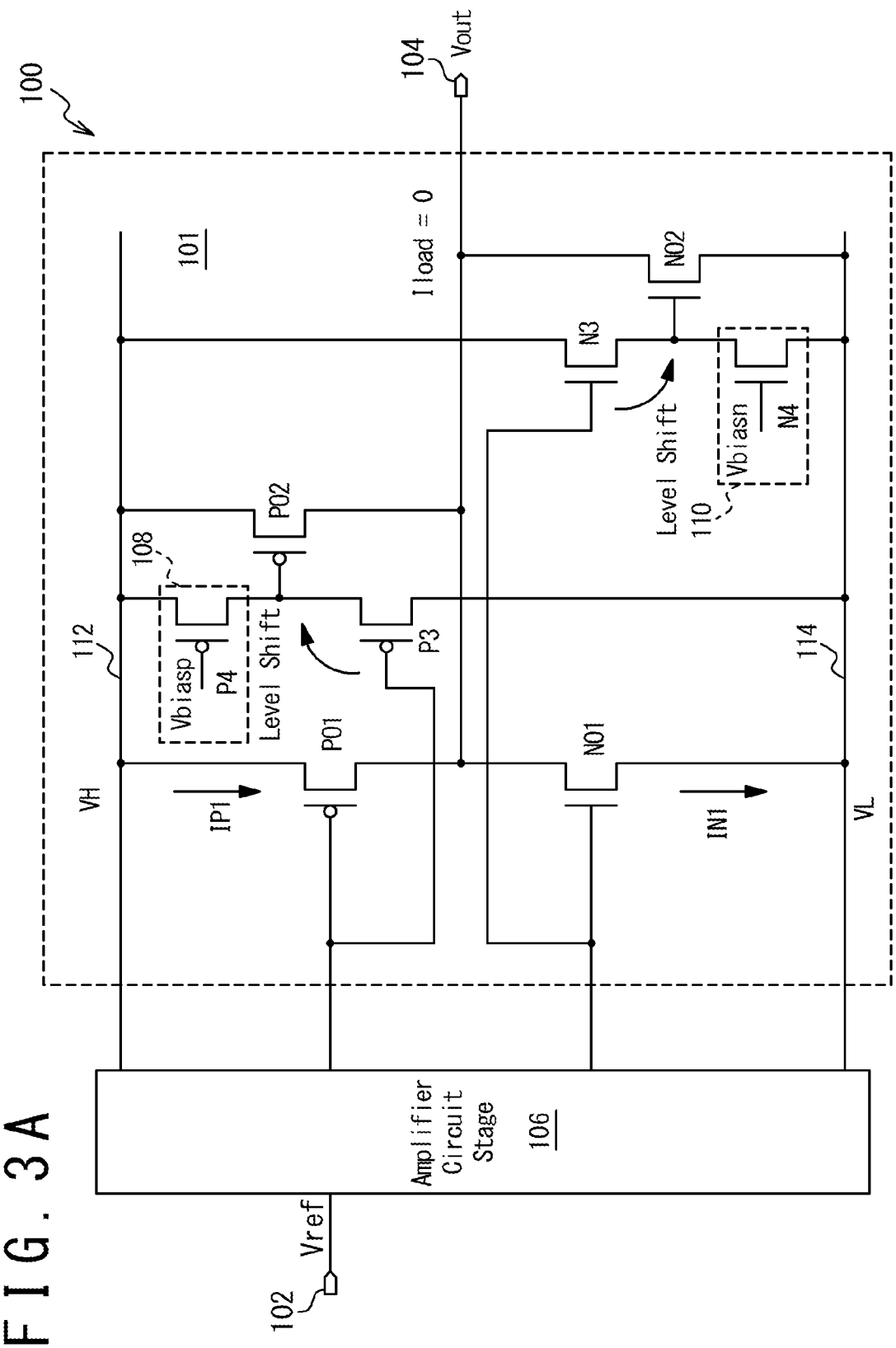
FIG. 3A, FIG. 3B, and FIG. 3C illustrate example operations of regulator circuitry, according to one or more embodiments.
Figure 3B:
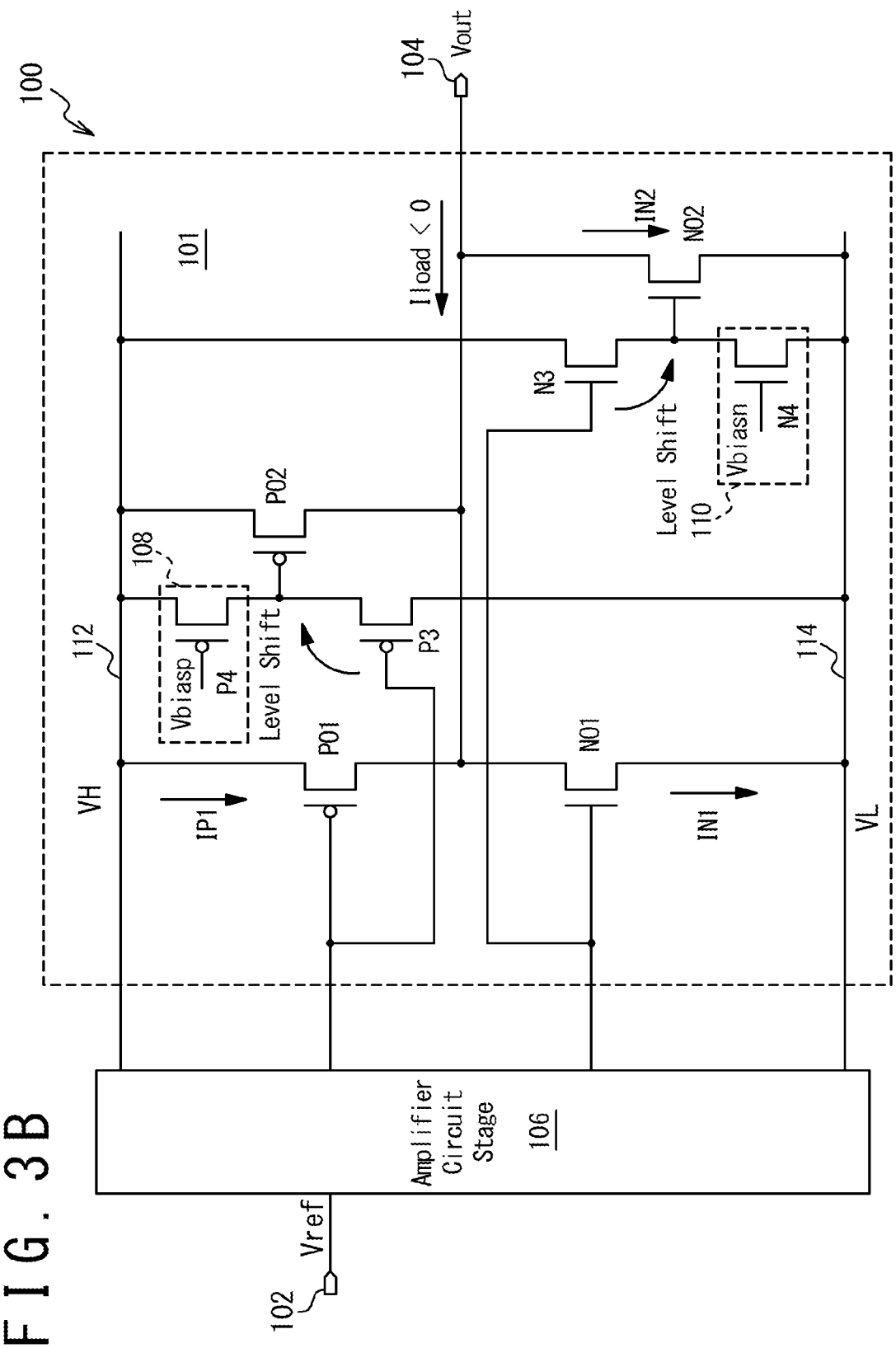
Figure 3C:
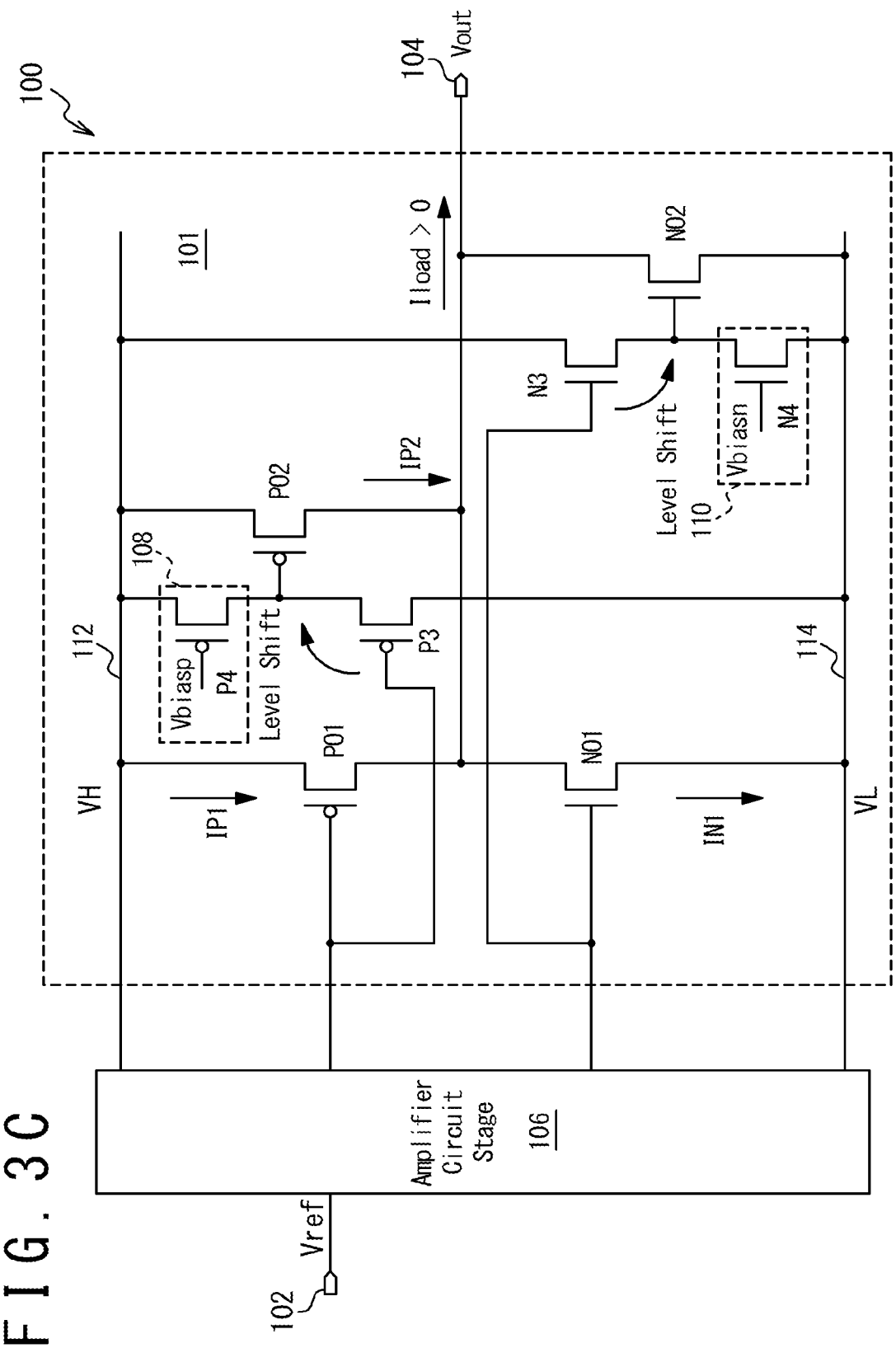

FIGS. 3A, 3B, and 3C illustrates example operations of the regulator circuitry 100 illustrated in FIG. 1, according to one or more embodiments. When the output voltage Vout is maintained at the specified level (e.g., the level of the reference voltage Vref), the load current Iload is zero as illustrated in FIG. 3A. In this case, no currents flow through the PMOS output transistor PO2 and the NMOS output transistor NO2 as the gate-source voltage of the PMOS output transistor PO2 is lower than the gate-source voltage of the PMOS output transistor PO1 and the gate-source voltage of the NMOS output transistor NO2 is lower than the gate-source voltage of the NMOS output transistor NO1. Accordingly, the self-consumption current through the output stage 101 of the regulator circuitry 100 is equal to the current IP1 through the PMOS output transistor PO1 (which is equal to the current IN1 through the NMOS output transistor NO1).

When the output voltage Vout becomes higher than the specified level, the regulator circuitry 100 operates as a current sink (i.e., Iload<0) as illustrated in FIG. 3B. In this case, the amplifier circuit stage 106 drives the gate of the NMOS output transistor NO1 to increase the gate-source voltage of the NMOS output transistor NO1, which also increases the gate-source voltage of the NMOS output transistor NO2 as the gate voltage of the NMOS output transistor NO2 is generated through level shifting of the gate voltage of the NMOS output transistor NO1. In embodiments where the NMOS output transistor NO2 has a sufficiently larger gate width than the gate width of the NMOS output transistor NO1, the NMOS output transistor NO2 primarily generates the load current Iload sunk from the load coupled to the output node 104 to discharge the load. It is noted that no current flows through the PMOS output transistor PO2. Also in this case, the self-consumption current through the output stage 101 of the regulator circuitry 100 is equal to the current IP1 through the PMOS output transistor PO1 (which is equal to the current IN1 through the NMOS output transistor NO1).

When the output voltage Vout becomes lower than the specified level, the regulator circuitry 100 operates as a current source (i.e., Iload>0) as illustrated in FIG. 3C. In this case, the amplifier circuit stage 106 drives the gate of the PMOS output transistor PO1 to increase the gate-source voltage of the PMOS output transistor PO1, which also increases the gate-source voltage of the PMOS output transistor PO2 as the gate voltage of the PMOS output transistor PO2 is generated through level shifting of the gate voltage of the PMOS output transistor PO1. In embodiments where the PMOS output transistor PO2 has a sufficiently larger gate width than the gate width of the PMOS output transistor PO1, the PMOS output transistor PO2 primarily generates the load current Iload supplied to the load coupled to the output node 104 to charge the load. It is noted that no current flows through the NMOS output transistor NO2. Also in this case, the self-consumption current through the output stage 101 of the regulator circuitry 100 is equal to the current IP1 through the PMOS output transistor PO1 (which is equal to the current IN1 through the NMOS output transistor NO1).

The circuit configuration of the regulator circuitry 100, which operates as illustrated in FIGS. 3A, 3B, and 3C in one or more embodiments, allows reducing the gate widths of the PMOS output transistor PO1 and the NMOS output transistor NO1, which are primarily used to maintain the output voltage Vout at the specified level (e.g., the level of the reference voltage Vref), since the PMOS output transistor PO2 and the NMOS output transistor NO2 are configured to drive the load current Iload when the output voltage Vout deviates from the specified level. The reduction in the gate widths of the PMOS output transistor PO1 and the NMOS output transistor NO1 may effectively suppress the current through the PMOS output transistor PO1 and the NMOS output transistor NO1 of the output stage 101, contributing to current consumption reduction.

The gate widths of the PMOS output transistor PO2 and the NMOS output transistor NO2 may be adjusted based on the load capacitance coupled to the output node 104. The PMOS output transistor PO2 and the NMOS output transistor NO2 may be designed to have increased gate widths when a large load capacitance is anticipated to be coupled to the output node 104. The increased gate widths allow the PMOS output transistor PO2 and the NMOS output transistor NO2 to drive the output voltage Vout to the specified level with an increased drive capability when the output voltage Vout undesirably deviates from the specified level. The increase in the gate widths of the PMOS output transistor PO2 and the NMOS output transistor NO2 may allow further reducing the gate widths of the PMOS output transistor PO1 and the NMOS output transistor NO1, which may contribute to further reduction in the self-consumption current of the output stage 101.

FIG. 4 illustrates an example configuration of regulator circuitry 100A, according to other embodiments. The regulator circuitry 100A is configured similarly to the regulator circuitry 100 illustrated in FIG. 1 except for that the PMOS output transistor PO2, the PMOS control transistor P3, and the constant current source 108 are omitted from the output stage, denoted by numeral 101A. The regulator circuitry 100A is configured to operate as a current sink when the output voltage Vout becomes higher than the specified level.

Figure 5:
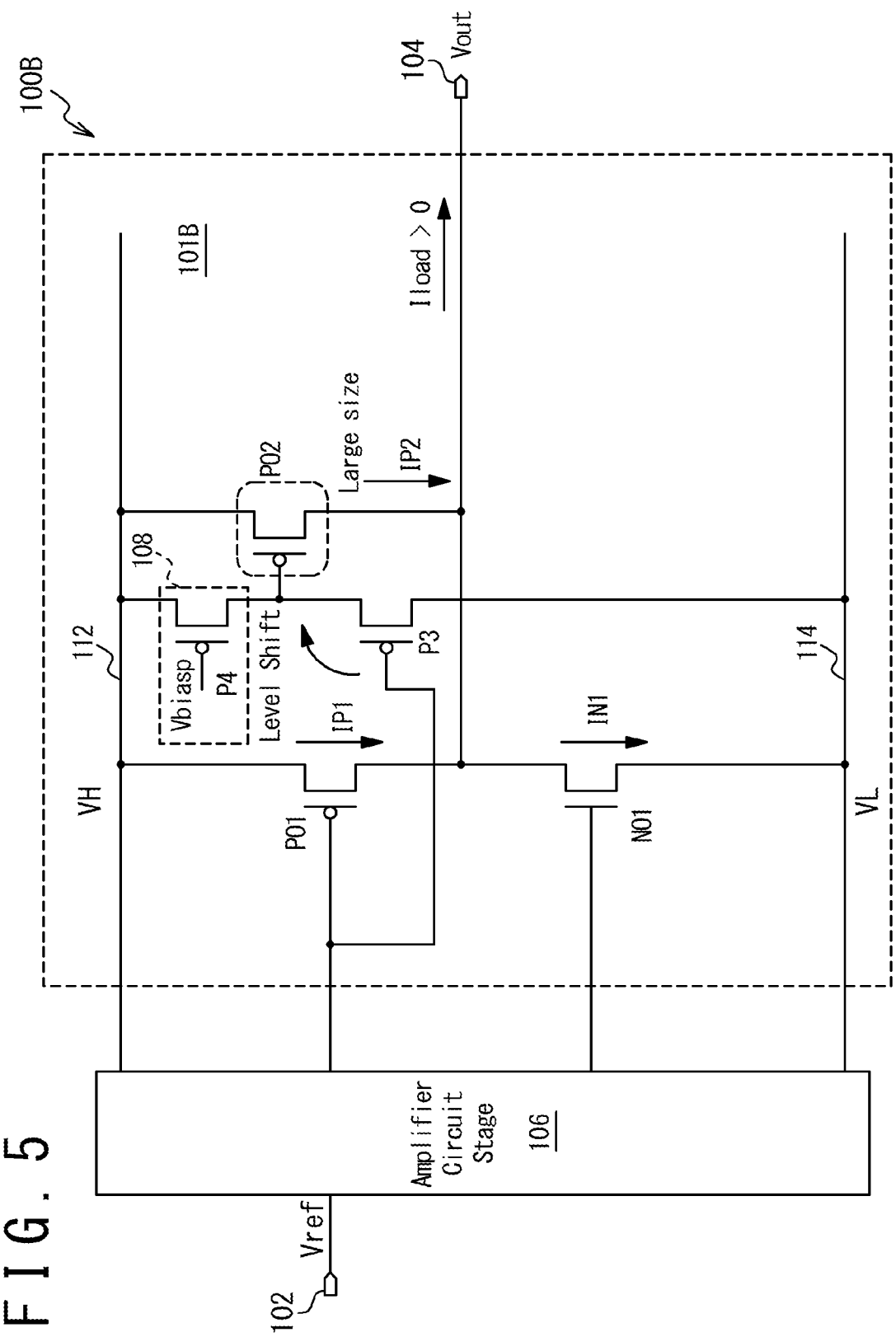
FIG. 5 illustrates an example configuration of regulator circuitry, according to still other embodiments.

FIG. 5 illustrates an example configuration of regulator circuitry 100B, according to still other embodiments. The regulator circuitry 100B is configured similarly to the regulator circuitry 100 illustrated in FIG. 1 except for that the NMOS output transistor NO2, the NMOS control transistor N3, and the constant current source 110 are omitted from the output stage, denoted by numeral 101B. The regulator circuitry 100B is configured to operate as a current source when the output voltage Vout becomes lower than the specified level.

Figure 6:
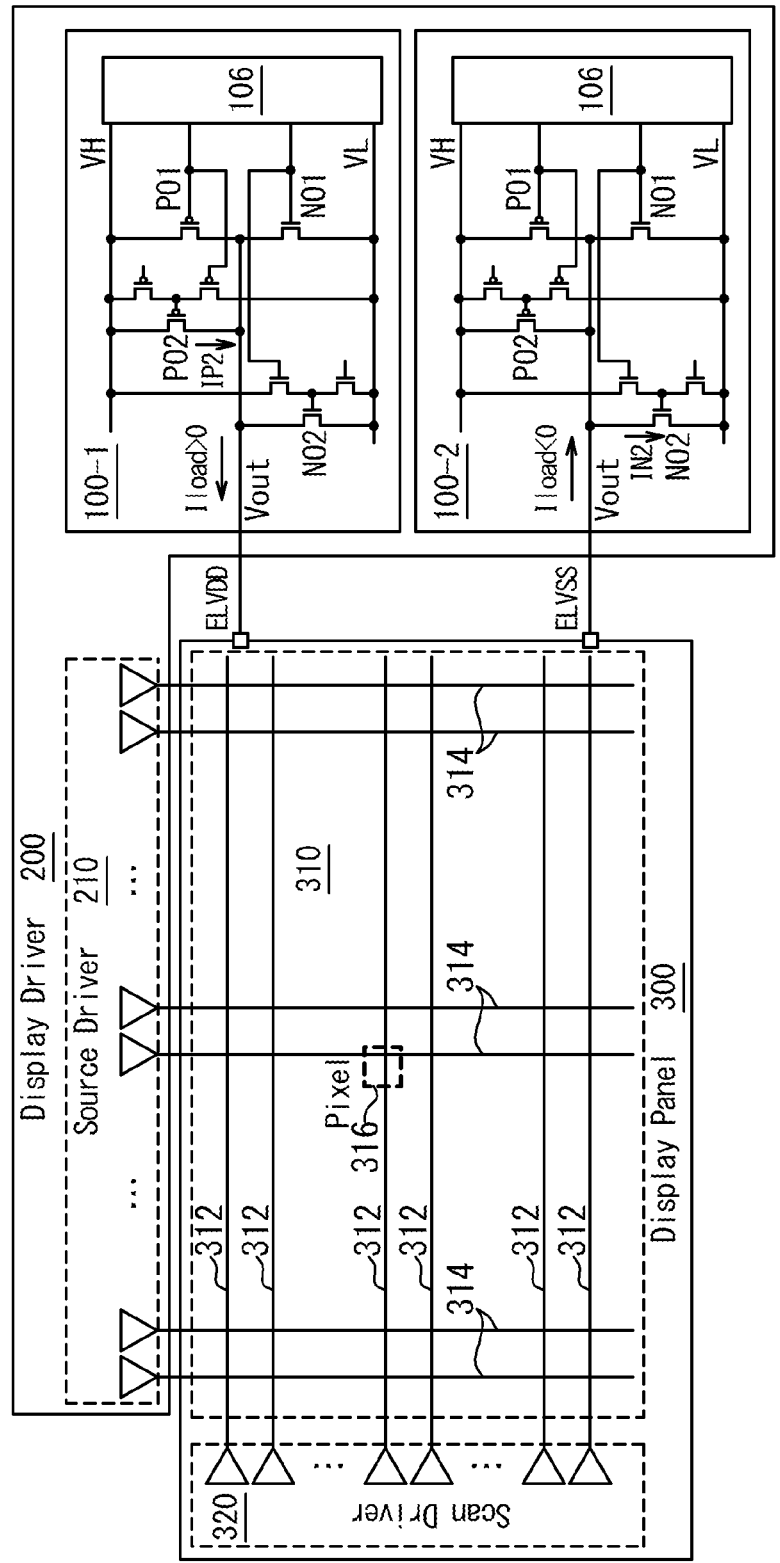
FIG. 6 illustrates example configurations of a display driver and a display panel, according to one or more embodiments.

FIG. 6 illustrates an example use of regulator circuitry 100 illustrated in FIG. 1, according to one or more embodiments. In the illustrated embodiment, regulator circuitry 100-1 and regulator circuitry 100-2, which are configured as illustrated in FIG. 1, are integrated in a display driver 200 configured to drive a display panel 300. The display panel 300 includes a display area (or active area) 310 and a scan driver 320. The display area 310 includes scan lines 312, source lines 314, and pixels 316 (one shown), each coupled to the corresponding scan line 312 and source line 314. The scan driver 320 is configured to drive the scan lines 312. The display driver 200 includes a source driver 210 configured to drive the source lines 314 based on image data corresponding to an image to be displayed on the display area 310.

In one implementation, the pixels 316 are each configured to receive a high-side power supply voltage ELVDD and a low-side power supply voltage ELVSS to operate circuit components incorporated therein. FIG. 7 illustrates an example configuration of a pixel 316, according to one or more embodiments. In the illustrated embodiment, the pixel 316 includes a select transistor 322, a drive transistor 324, a storage capacitor 326, and an organic light emitting diode (OLED) 328. In the illustrated embodiment, the select transistor 322 and the drive transistor 324 are configured as PMOS thin film transistors. The select transistor 322 has a first source/drain coupled to the corresponding source line 314, a second source/drain coupled to the gate of the drive transistor 324, and a gate coupled to the corresponding scan line 312. The drive transistor 324 and the OLED 328 are coupled in series between a high-side power supply line 332 to which the high-side power supply voltage ELVDD is provided and a low-side power supply line 334 to which the low-side power supply voltage ELVSS is supplied. In the illustrated embodiment, the drive transistor 324 has a source coupled to the high-side power supply line 332 and a drain coupled to the OLED 328. The OLED 328 has an anode coupled to the drain of the drive transistor 324 and a cathode coupled to the low-side power supply line 334. The storage capacitor 326 is coupled between the gate and source of the drive transistor 324. It is noted that the configuration of the pixel 316 may be variously modified, not limited to the illustrated example.

In the embodiment illustrated in FIG. 6, the regulator circuitry 100-1 is configured to generate and supply the high-side power supply voltage ELVDD to the display panel 300, and the regulator circuitry 100-2 is configured to generate and supply the low-side power supply voltage ELVSS to the display panel 300. The use of the regulator circuitry 100-1 and 100-2 may effectively reduce current consumption of the display driver 200. In other embodiments, the regulator circuitry 100B illustrated in FIG. 5 may be used as the regulator circuitry 100-1 to generate the high-side power supply voltage ELVDD. In still other embodiments, the regulator circuitry 100A illustrated in FIG. 4 may be used as the regulator circuitry 100-2 to generate the low-side power supply voltage ELVSS.

Method 800 of FIG. 8 illustrates steps for operating regulator circuitry (e.g., the regulator circuitry 100 illustrated in FIGS. 1, 2, 4 and 5). It is noted that one or more of the steps illustrated in FIG. 8 may be omitted, repeated, and/or performed in a different order than the order illustrated in FIG. 8. It is further noted that two or more steps may be implemented at the same time.

The method includes supplying, based on a specified level of an output voltage (e.g., the output voltage Vout), a first gate voltage to a gate of a first output transistor (e.g., the PMOS output transistor PO1 or the NMOS output transistor NO1) of a first channel conductivity type at step 802. The first output transistor has a drain coupled to an output node (e.g., the output node 104) on which the output voltage is generated and a source coupled to a first power supply line (e.g., the high-side power supply line 112 or the low-side power supply line 114). The method further includes supplying a first level-shifted gate voltage to a gate of a second output transistor (e.g., the PMOS output transistor PO2 or the NMOS output transistor NO2) of the first channel conductivity type at step 804. The second output transistor has a drain coupled to the output node and a source coupled to the first power supply line. The first level-shifted gate voltage is generated on a source of a first control transistor (e.g., the PMOS control transistor P3 or the NMOS control transistor N3) of the first channel conductivity type. The first control transistor has a gate coupled to the gate of the first output transistor. The method further includes supplying, based on the specified level of the output voltage, a second gate voltage to a gate of a third output transistor (e.g., the NMOS output transistor NO1 or the PMOS output transistor PO1) of a second channel conductivity type opposite to the first channel conductivity type at step 806. The third output transistor has a drain coupled to the output node and a source coupled to a second power supply line (e.g., the low-side power supply line 114 or the high-side power supply line 112.)

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. Regulator circuitry, comprising:
   a first output transistor of a first channel conductivity type, the first output transistor having a drain coupled to an output node on which an output voltage is generated and a source coupled to a first power supply line;
   a second output transistor of the first channel conductivity type, the second output transistor having a drain coupled to the output node and a source coupled to the first power supply line, wherein a gate width of the second output transistor is larger than a gate width of the first output transistor;
   a third output transistor of a second channel conductivity type opposite to the first channel conductivity type, the third output transistor having a drain coupled to the output node and a source coupled to a second power supply line;
   a first control transistor of the first channel conductivity type, the first control transistor having a gate coupled to a gate of the first output transistor and a source coupled to a gate of the second output transistor; and
   a circuit stage configured to drive the gates of the first output transistor, the third output transistor, and the first control transistor based on a specified level of the output voltage.

2. The regulator circuitry of claim 1, wherein the first control transistor further has a drain coupled to the second power supply line.

3. The regulator circuitry of claim 1, wherein the first channel conductivity type is a negative channel conductivity type,
   wherein the second channel conductivity type is a positive channel conductivity type,
   wherein a first power supply voltage is provided to the first power supply line, and
   wherein a second power supply voltage higher than the first power supply voltage is provided to the second power supply line.

4. The regulator circuitry of claim 1, wherein the first channel conductivity type is a positive channel conductivity type,
   wherein the second channel conductivity type is a negative channel conductivity type,
   wherein a first power supply voltage is provided to the first power supply line, and
   wherein a second power supply voltage lower than the first power supply voltage is provided to the second power supply line.

5. The regulator circuitry of claim 1, further comprising:
a fourth output transistor of the second channel conductivity type, the fourth output transistor having a drain coupled to the output node; and
a second control transistor of the second channel conductivity type, the second control transistor having a gate coupled to a gate of the third output transistor, and a source coupled to a gate of the fourth output transistor.

6. The regulator circuitry of claim 5, wherein the circuit stage is further configured to drive the gate of the third output transistor and the gate of the second control transistor based on the specified level of the output voltage.

7. The regulator circuitry of claim 5,
wherein a gate width of the fourth output transistor is larger than a gate width of the third output transistor.

8. The regulator circuitry of claim 5, further comprising:
a first constant current source configured to generate a first constant current through the first control transistor; and
a second constant current source configured to generate a second constant current through the second control transistor.

9. The regulator circuitry of claim 5, wherein the first control transistor further has a drain coupled to the second power supply line, and
wherein the second control transistor further has a drain coupled to the first power supply line.

10. The regulator circuitry of claim 5, wherein the first channel conductivity type is a negative channel conductivity type,
wherein the second channel conductivity type is a positive channel conductivity type,
wherein a first power supply voltage is provided to the first power supply line, and
wherein a second power supply voltage is higher than the first power supply voltage is provided to the second power supply line.

11. Regulator circuitry, comprising:
a first output transistor of a first channel conductivity type, the first output transistor having a drain coupled to an output node on which an output voltage is generated and a source coupled to a first power supply line;
a second output transistor of the first channel conductivity type, the second output transistor having a drain coupled to the output node and a source coupled to the first power supply line;
a third output transistor of a second channel conductivity type opposite to the first channel conductivity type, the third output transistor having a drain coupled to the output node and a source coupled to a second power supply line;
a first control transistor of the first channel conductivity type, the first control transistor having a gate coupled to a gate of the first output transistor and a source coupled to a gate of the second output transistor;
a circuit stage configured to drive the gates of the first output transistor, the third output transistor, and the first control transistor based on a specified level of the output voltage; and
a first constant current source configured to generate a first constant current through the first control transistor.

12. Regulator circuitry, comprising:
a first output transistor of a first channel conductivity type, the first output transistor having a drain coupled to an output node on which an output voltage is generated and a source coupled to a first power supply line;
a second output transistor of the first channel conductivity type, the second output transistor having a drain coupled to the output node and a source coupled to the first power supply line;
a third output transistor of a second channel conductivity type opposite to the first channel conductivity type, the third output transistor having a drain coupled to the output node and a source coupled to a second power supply line;
a circuit stage configured to:
provide a first gate voltage to a gate of the first output transistor based on a specified level of the output voltage; and
provide a second gate voltage to a gate of the third output transistor based on the specified level of the output voltage; and
first level shifting circuitry configured to provide a first level-shifted gate voltage to a gate of the second output transistor, the first level-shifted gate voltage being generated through level shifting of the first gate voltage.

13. The regulator circuitry of claim 12, wherein a gate width of the second output transistor is larger than a gate width of the first output transistor.

14. The regulator circuitry of claim 12, wherein the first channel conductivity type is a negative channel conductivity type,
wherein the second channel conductivity type is a positive channel conductivity type,
wherein a first power supply voltage is provided to the first power supply line, and
wherein a second power supply voltage higher than the first power supply voltage is provided to the second power supply line.

15. The regulator circuitry of claim 12, wherein the first channel conductivity type is a positive channel conductivity type,
wherein the second channel conductivity type is an negative channel conductivity type,
wherein a first power supply voltage is provided to the first power supply line, and
wherein a second power supply voltage lower than the first power supply voltage is provided to the second power supply line.

16. The regulator circuitry of claim 12, further comprising:
a fourth output transistor of the second channel conductivity type, the fourth output transistor having a drain coupled to the output node and a source coupled to the second power supply line; and
second level shifting circuitry configured to provide a second level-shifted gate voltage to a gate of the fourth output transistor, the second level-shifted gate voltage being generated through level shifting of the second gate voltage.

17. The regulator circuitry of claim 16, wherein a gate width of the second output transistor is larger than a gate width of the first output transistor, and
wherein a gate width of the fourth output transistor is larger than a gate width of the third output transistor.

18. A method, comprising:
supplying, based on a specified level of an output voltage, a first gate voltage to a gate of a first output transistor of a first channel conductivity type, the first output transistor having a drain coupled to an output node on which the output voltage is generated and a source coupled to a first power supply line;

supplying a first level-shifted gate voltage to a gate of a second output transistor of the first channel conductivity type, the second output transistor having a drain coupled to the output node and a source coupled to the first power supply line, the first level-shifted gate voltage being generated on a source of a first control transistor of the first channel conductivity type, the first control transistor having a gate coupled to the gate of the first output transistor; and supplying, based on the specified level of the output voltage, a second gate voltage to a gate of a third output transistor of a second channel conductivity type opposite to the first channel conductivity type, the third output transistor having a drain coupled to the output node and a source coupled to a second power supply line.

19. The method of claim 18, further comprising:

supplying a second level-shifted gate voltage to a gate of a fourth output transistor of the second channel conductivity type, the fourth output transistor having a drain coupled to the output node and a source coupled to the second power supply line, the second level-shifted gate voltage being generated on a source of a second control transistor of the second channel conductivity type, the second control transistor having a gate coupled to the gate of the third output transistor.

\* \* \* \* \*